(12) United States Patent
Piazza et al.

(10) Patent No.: US 9,573,457 B2
(45) Date of Patent: Feb. 21, 2017

(54) HYBRID POWERTRAIN UNIT FOR MOTOR VEHICLES WITH ENGAGEMENT DEVICES ON OPPOSITE SIDES OF THE ELECTRIC MACHINE

(71) Applicant: C.R.F. Societa Consortile per Azioni, Orbassano (Turin) (IT)

(72) Inventors: Andrea Piazza, Orbassano (IT); Marco Garabello, Orbassano (IT); Gianluigi Pregnolato, Orbassano (IT); Fabio Pesola, Orbassano (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 106 days.

(21) Appl. No.: 14/714,604

(22) Filed: May 18, 2015

(65) Prior Publication Data

US 2015/0360555 A1    Dec. 17, 2015

(30) Foreign Application Priority Data

Jun. 17, 2014   (EP) .................................... 14172693

(51) Int. Cl.
*F16H 3/72*     (2006.01)
*B60K 6/445*    (2007.10)
(Continued)

(52) U.S. Cl.
CPC ................. *B60K 6/445* (2013.01); *B60K 6/26* (2013.01); *B60K 6/365* (2013.01); *B60K 6/387* (2013.01);
(Continued)

(58) Field of Classification Search
CPC ............. B60K 6/445; B60K 6/48; B60K 6/40; B60K 6/365; B60K 6/547; B60K 6/387; B60K 6/26; B60K 2025/022; B60K 6/52; B60K 2006/4841; B60K 2025/005; B60K 2006/381; F16H 2037/101
See application file for complete search history.

(56) References Cited

U.S. PATENT DOCUMENTS 7,278,943 B2 * 10/2007 Puiu ................... B60K 17/3462
                                                     475/86
7,996,135 B2 *  8/2011 Ishii .................... F02N 11/0855
                                                     123/179.3
(Continued)

FOREIGN PATENT DOCUMENTS

DE      102011010085      8/2012
EP         2727757        5/2014
(Continued)

OTHER PUBLICATIONS

European Search Report for Application No. 14172693.5 mailed Dec. 1, 2014, 3 pages.

*Primary Examiner* — David J Hlavka
(74) *Attorney, Agent, or Firm* — Remarck Law Group PLC (57) ABSTRACT

A hybrid powertrain unit comprises an engine and a gearbox with a primary shaft connectable to an engine shaft via a clutch and a secondary shaft with an output pinion meshing with a first differential crown wheel. An electric machine is configured to function as an electric motor and generator, having a shaft connected by a transmission to a second differential crown wheel. The transmission, arranged between the electric machine shaft and the second crown wheel includes a first engagement device. The electric machine shaft is connected to the engine shaft by a belt transmission including a belt engaged on a first pulley connected to the electric machine shaft and a second pulley connected to the engine shaft. Between the electric machine shaft and said first pulley is a second engagement device. The engagement devices are arranged coaxially with the
(Continued)

electric machine shaft on opposite sides of the electric machine.

8 Claims, 13 Drawing Sheets

(51) Int. Cl.
| | |
|---|---|
| *B60K 6/387* | (2007.10) |
| *B60K 6/26* | (2007.10) |
| *B60K 6/365* | (2007.10) |
| *B60K 6/547* | (2007.10) |
| *B60K 6/40* | (2007.10) |
| *B60K 6/48* | (2007.10) |
| *F16H 37/10* | (2006.01) |
| *B60K 6/38* | (2007.10) |
| *B60K 6/52* | (2007.10) |
| *B60K 25/00* | (2006.01) |
| *B60K 25/02* | (2006.01) |

(52) U.S. Cl.
CPC . *B60K 6/40* (2013.01); *B60K 6/48* (2013.01); *B60K 6/547* (2013.01); *B60K 6/52* (2013.01); *B60K 2006/381* (2013.01); *B60K 2006/4841* (2013.01); *B60K 2025/005* (2013.01); *B60K 2025/022* (2013.01); *F16H 2037/101* (2013.01); *Y02T 10/6221* (2013.01); *Y02T 10/6265* (2013.01); *Y10S 903/906* (2013.01); *Y10S 903/91* (2013.01); *Y10S 903/914* (2013.01); *Y10S 903/919* (2013.01)

(56) References Cited

U.S. PATENT DOCUMENTS

| | | | |
|---|---|---|---|
| 8,087,483 B2* | 1/2012 | Bucknor | B60K 6/36 180/65.245 |
| 2002/0065163 A1 | 5/2002 | Deichl | |
| 2010/0193268 A1 | 8/2010 | McGee | |
| 2013/0036863 A1* | 2/2013 | Blessing | B60K 6/40 74/661 |
| 2013/0172140 A1* | 7/2013 | Potter | B60K 6/54 475/5 |
| 2013/0252774 A1* | 9/2013 | Suntharalingam | B60K 6/365 475/5 |
| 2014/0200111 A1* | 7/2014 | Murakami | B60K 6/48 477/4 |
| 2014/0373675 A1* | 12/2014 | Kaltenbach | B60K 6/547 74/661 |

FOREIGN PATENT DOCUMENTS

| | | |
|---|---|---|
| WO | 2005095141 | 10/2005 |
| WO | 2013007886 | 1/2013 |

* cited by examiner

HYBRID POWERTRAIN UNIT FOR MOTOR VEHICLES WITH ENGAGEMENT DEVICES ON OPPOSITE SIDES OF THE ELECTRIC MACHINE

CROSS REFERENCE TO RELATED APPLICATIONS

This application claims priority to European Patent Application No. 14172693.5 filed on Jun. 17, 2014, the entire disclosure of which is incorporated herein by reference.

FIELD OF THE INVENTION

The present invention relates to a hybrid powertrain unit for motor vehicles, of the type comprising:
an internal-combustion engine; and
a gearbox device including:
at least one primary shaft that can be connected to the crankshaft of the motor vehicle by means of a clutch device;
at least one secondary shaft, the axis of which is parallel and arranged at a distance from the axis of said primary shaft, and which carries an output pinion;
a plurality of pairs of gears corresponding to a plurality of forward gear ratios, in which the gears of each pair are rigidly connected in rotation with respect to one between said primary shaft and said secondary shaft, and the other is freely rotatable with respect to the other of said primary and secondary shafts; and
a plurality of gear-selection devices for coupling in rotation each of said freely rotatable gears with the shaft on which it is mounted,
said unit further comprising:
a differential, having a first crown wheel meshing with said output pinion of said secondary shaft of the gearbox device; and
an electric machine adapted to operate both as electric motor and as electric generator, and having a casing rigidly connected to a supporting structure of said powertrain unit, and a shaft connected by means of a transmission to a second crown wheel of said differential.

A hybrid powertrain unit of the type referred to above is known, for example, from EP 1 868 832 B1. DE 10 2009 0566366 A1 and US 2002/065163 A1 also disclose a hybrid powertrain unit of the type referred to above, which also comprises an engagement device arranged, in the connecting transmission, between the shaft of the electric machine and the aforesaid second crown wheel of the differential, and means for actuating the aforesaid engagement device.

It should likewise be noted that in European patent application EP 13153802 (already filed, but not yet published at the date of priority of the present invention), the present applicant has proposed a powertrain unit of the type referred to above, with the engagement device arranged between the shaft of the electric machine and the second crown wheel of the differential, wherein moreover the electric machine has a shaft connected to the shaft of the internal-combustion engine at the end of the latter opposite to the end connected to the gearbox device, by means of a belt transmission including an endless belt engaged on a first pulley connected to the shaft of the electric machine and on a second pulley connected to the shaft of the internal-combustion engine. This document illustrates also a second engagement device arranged between the second pulley and the shaft of the internal-combustion engine. Alternatively, this document mentions also the possibility of providing the second engagement device in a position arranged between said first pulley and the shaft of the electric machine.

OBJECT OF THE INVENTION

The object of the present invention is to provide a hybrid powertrain unit that will have a simple structure and small overall dimensions and that will be efficient, reliable, and versatile in operation.

With a view to achieving the above purpose, the subject of the invention is a hybrid powertrain unit of the type specified above, with the engagement device arranged between the shaft of the electric machine and the second crown wheel of the differential, the unit being further characterized in that:
the electric machine has a shaft connected to the shaft of the internal-combustion engine to the end of the latter opposite to the end connected to the gearbox device, by means of a belt transmission including an endless belt engaged on a first pulley connected to the shaft of the electric machine and on a second pulley connected to the shaft of the internal-combustion engine;
arranged between the shaft (16) of the electric machine (E) and said first pulley (31) is a second engagement device (34); and
said first and second engagement devices (25, 34) are both arranged coaxially with the shaft of the electric machine, on each of the opposite sides with respect to the electric machine (E).

Direct connection between the shaft of the internal-combustion engine and the shaft of the electric machine makes it possible to provide, for example, a function of the electric machine as BAS (Belt Alternator Starter), i.e., as generator driven by the engine or as electric motor for starting the internal-combustion engine.

In a preferred embodiment, the aforesaid first engagement device and second engagement device are clutch engagement devices provided with actuator means comprising an electromagnetic or electrohydraulic actuator and an electronic unit for controlling the actuators.

Activation of the engagement devices is controlled independently by the electronic control unit of the motor vehicle according to a pre-arranged program, as a function of the operating parameters of the engine and of the motor vehicle.

Use of the engagement device in the connection between the differential and the electric machine enables the connection to be made in the operating conditions where this is desired, to the advantage of efficiency of the system.

In a variant, the above transmission that connects the shaft of the electric machine to the aforesaid second crown wheel of the differential includes a gear for driving a transmission shaft connected to a further axle of the vehicle.

Provision in the unit according to the invention of a gear for driving a transmission shaft connected to a further axle of the vehicle enables efficient application to vehicles with four-wheel drive. The aforesaid gear for driving the transmission shaft connected to the further axle of the vehicle may be arranged, for example, between the second crown wheel of the differential and the engagement device, or else alternatively between the engagement device and the shaft of the electric machine. In the former case, the torque of the electric machine is shared between the front axle and the rear axle in a way identical to what occurs for the torque of the internal-combustion engine, whereas in the latter case the functions of the electric machine are irrespective of the distribution of the torque of the internal-combustion engine and may even envisage that 100% of the torque of the internal-combustion engine is transmitted to the front axle of the motor vehicle and 100% of the torque of the electric machine is transmitted to the rear axle.

In a further embodiment, the above transmission that connects the shaft of the electric machine to said second crown wheel of the differential includes at least one gear-reduction jump constituted by a belt transmission.

Further characteristics of the invention are indicated in the annexed independent claims, which form an integral part of the description of the invention.

BRIEF DESCRIPTION OF THE FIGURES

The invention will now be illustrated with reference to the annexed drawings, which are provided purely by way of non-limiting example and in which.

DETAILED DESCRIPTION OF THE INVENTION

In FIGS. 1-13, parts in common are designated by the same reference numbers. In said figures, number 1 designates as a whole a hybrid powertrain unit for motor vehicles, comprising an internal-combustion engine E, a gearbox device C, a differential D, and an electric machine M.

According to the conventional art, the gearbox device C has a casing 2, rotatably mounted inside which is a primary shaft 3 by means of rolling bearings 4. The primary shaft can be connected to the shaft 5 of the engine E via a clutch device 6 of any known type. Moreover, rotatably mounted inside the casing 2 of the gearbox C, via rolling bearings 8, is a secondary shaft 7. The axis of the secondary shaft 7 is parallel to and arranged at a distance from the axis of the primary shaft 3.

Of course, even though the annexed drawings show a gearbox of the conventional type, which includes a single primary shaft and a single secondary shaft, the invention applies to any other known configuration of the gearbox device, including, in particular, the configurations that envisage two coaxial primary shafts that can be connected selectively to the crankshaft by means of a double-clutch device and have any number of secondary shafts.

To return to the configuration illustrated in the drawings by way of example, the primary shaft 3 and the secondary shaft 7 carry pairs of gears meshing together to provide a plurality of forward gear ratios. One gear of each pair is rigidly connected to the shaft by which it is carried, whereas the other gear of each pair is mounted freely rotatable on the respective shaft.

In the case of the example illustrated, the first gear ratio is obtained by a pair of gears including a gear I1 rigidly connected to the primary shaft 3 and a gear I2 mounted freely rotatable on the secondary shaft 7. The second gear ratio is obtained by means of a gear II1 rigidly connected to the primary shaft 3 and a gear II2 mounted freely rotatable on the secondary shaft 7. The third, fourth, fifth, and sixth gear ratios are obtained by means of pairs of gears including gears III1, IV1, V1, VI1 rigidly connected to the secondary shaft 7 and corresponding gears III2, IV2, V2 and VI2 mounted freely rotatable on the primary shaft 3.

Once again according to the known art, the primary and secondary shafts 3, 7 carry selection devices S1/2, S3/4 and S5/6 for connecting selectively in rotation each of the freely rotatable gears I2, II2, III2, IV2, V2, VI2 to the respective shafts on which they are carried.

The gearbox device C further comprises a third shaft (not visible in the plate of drawings), which carries in a freely rotatable way a reverse gear and a selection device for connecting said gear in rotation to the respective shaft in such a way as to transmit the motion of rotation of the primary shaft 3 to the secondary shaft 7 with a reversal of the direction of rotation.

The secondary shaft 7 carries an output pinion 9 meshing with a first crown wheel 10 of the differential D. The differential D, which has a structure of a type in itself known, has a casing 11 rigidly connected to the casing 2 of the gearbox device C and has two output shafts 12, 13 for transmitting the motion to the gears of the motor vehicle via constant-velocity universal joints 14. The crown wheel 10 is rigidly connected to the gear-train carrier of the differential, which is rotatably mounted within the casing 11 by means of bearings 15.

The electric machine M is adapted to function both as electric motor and as electric generator, according to the operating conditions. In the embodiment illustrated in FIG. 1, the electric machine M shares the axes of the two output shafts 12, 13 of the differential D and is axially traversed by its shaft, designated by 16. The shaft 16 is hollow and is in turn axially traversed by the output shaft 13 of the differential D so as to enable aligned arrangement of the electric machine M with the differential D. The casing 17 of the electric machine M is rigidly connected to the casing 11 of the differential D and possibly also to the structure of the internal-combustion engine E. The shaft 16 of the electric machine M is rotatably supported within the casing 17 via rolling bearings 18.

Figure 1:
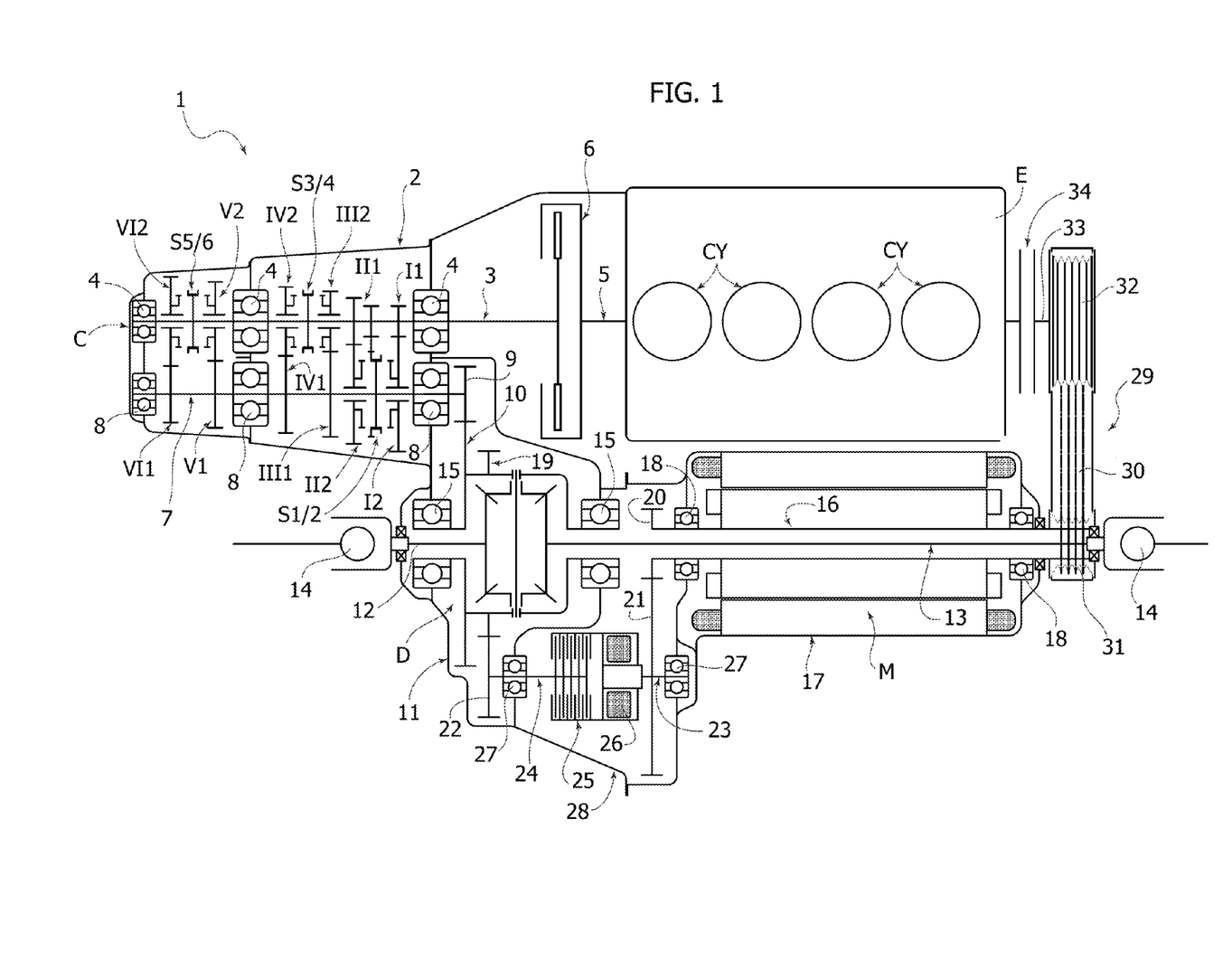
FIG. 1 is a schematic view of a first embodiment of a powertrain unit that has been already proposed by the present applicant in European patent application EP 13153802 (already filed, but not yet published at the date of priority of the present invention)

The shaft 16 of the electric machine M is connected in rotation to a second crown wheel 19 of the differential D rigidly connected to the gear-train carrier of the differential. In the case of FIG. 1, the connection between the shaft 16 of the electric machine M and the crown wheel 19 of the differential D is obtained by a double gear-reduction jump, obtained by means of a first pair of gears 20, 21 and a second pair of gears 22, 19. The gear 20 is rigidly connected to the shaft 16 of the electric machine M, whereas the gears 21, 22 are carried by two shafts 23, 24 aligned with one another, which can be connected by means of an engagement device 25, which, in the case of the example illustrated, is a clutch device controlled by an electromagnetic actuator 26, which is in turn driven by an electronic control unit U (illustrated schematically only in FIG. 1). The actuator could also be of an electrohydraulic type, or of any other known type. Also the engagement device could be of any other known type. The two shafts 23, 24 are rotatably mounted via rolling bearings 27 within a casing 28 of the gear-reduction transmission, which is rigidly connected to the casing 11 of the differential D and with the casing 17 of the electric machine M.

With reference to the specific example illustrated, the engagement device 25 and the electromagnetic actuator 26 may be obtained in any known way. For these reasons, the constructional details of said elements are not illustrated herein, also in order to render the drawings simpler and of easier to understand.

Finally, designated as a whole by CY are the cylinders of the engine that are arranged vertically in the condition where the unit is mounted on the motor vehicle. Consequently, the views illustrated in FIGS. 1-4 are top plan views, with reference to the arrangement where the powertrain unit is mounted in the motor vehicle. Typically, the unit is mounted in the front part of the motor vehicle, in association with the front wheels of the motor vehicle.

The electric machine M functions as electric motor or as generator, according to the operating conditions of the engine and of the motor vehicle. In particular, the following different operating modes are possible:

- electric drive (internal-combustion engine E turned off and gearbox in neutral);
- hybrid drive (internal-combustion engine turned on and gearbox with a gear engaged); and
- recovery of energy during braking (internal-combustion engine turned on and gear in neutral or else clutch 6 between the internal-combustion engine and gearbox disengaged).

The electric machine M may moreover be used as electric motor for filling the gap in the torque supplied by the internal-combustion engine to the wheels of the vehicle during gear change.

Finally, the engagement device 25 enables decoupling of the electric machine M in the operating conditions in which intervention thereof is not required.

As already mentioned, FIG. 1 of the annexed drawings regards a solution already proposed by the present applicant in the European patent application No. EP 13153802 (already filed, but not yet published at the date of priority of the present invention). In this solution, there is provided a direct connection of the shaft 16 of the electric machine M to the shaft 5 of the internal-combustion engine E, at the end of the engine E opposite to the one connected to the gearbox device C. For this purpose, in the example illustrated, an auxiliary belt transmission 29 is provided, including an endless belt 30 engaged on a first pulley 31 carried by the shaft 16 of the electric machine M and on a second pulley 32 carried by the shaft 33 that can be connected to the shaft 5 of the internal-combustion engine via an engagement device 34, for example, an electromagnetically governed one or one of any other known type. An engagement device of this type is, for example, described and illustrated in the document No. EP 1 529 957 A1 filed in the name of the present applicant.

The belt transmission 29 and the engagement device 34 enable direct connection of the shaft of the internal-combustion engine to the shaft of the electric machine M to provide, for example, a function of the electric machine as BAS (Belt Alternator Starter), i.e., as a generator driven by the engine or as electric motor for starting the internal-combustion engine.

In the modality of starting of the internal-combustion engine, the engagement device 25 is disengaged and the engagement device 34 is engaged.

In the modality of generation of current with the vehicle standing still, the internal-combustion engine is turned on, the engagement device 25 is disengaged, and the engagement device 34 is engaged.

In vehicles equipped with a stop-and-go device, in which the internal-combustion engine turns off automatically when the vehicle is stationary, the electric machine M makes it possible to keep auxiliary devices governed by the belt 30 functioning (such as the compressor of the air-conditioning system). In this condition, the engagement device 34 is disengaged.

Figure 2:
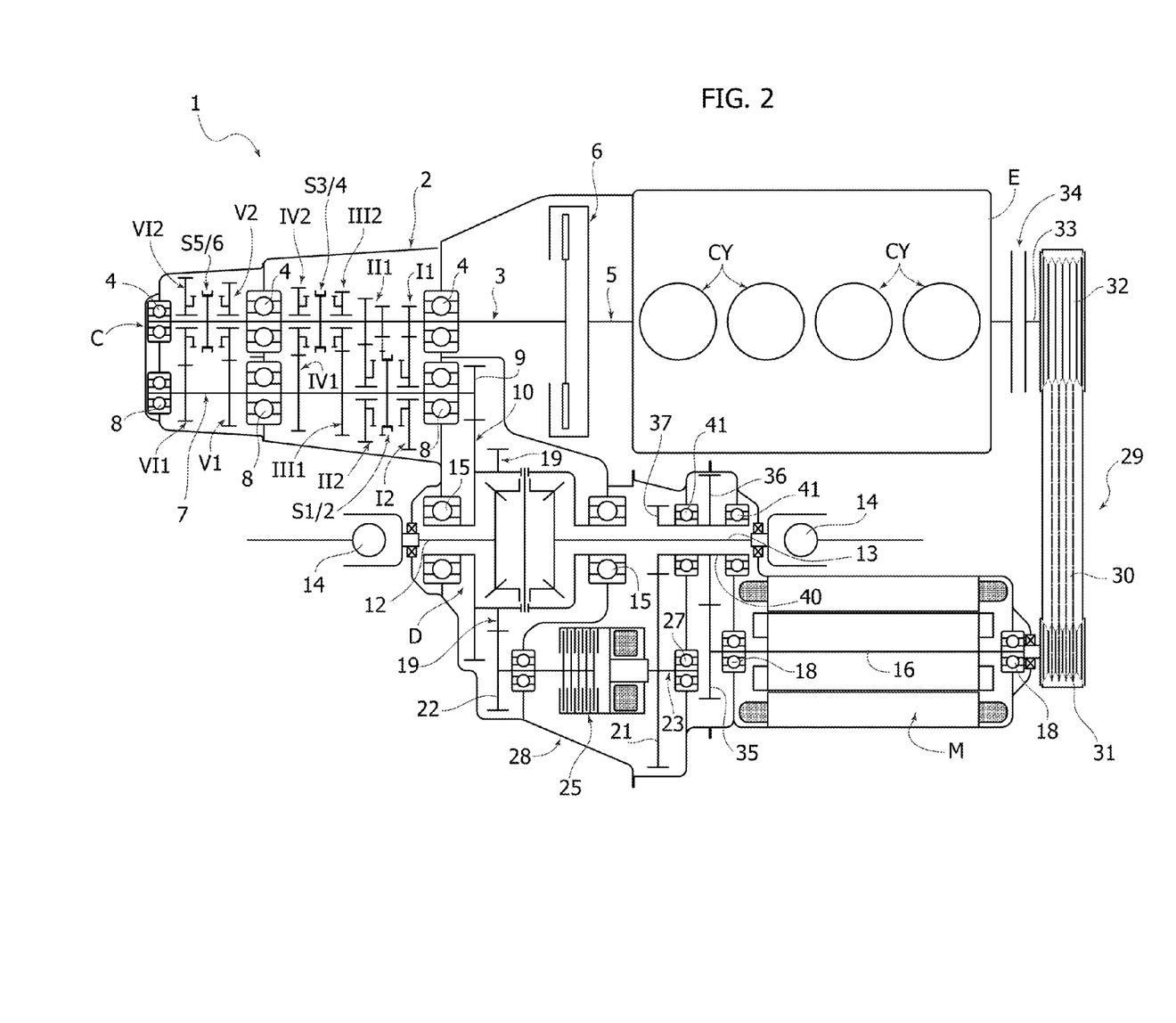
FIG. 2 is a schematic view of a variant of the powertrain unit of FIG. 1, likewise already proposed by the present applicant in European patent application EP 13153802.
Figure 3:
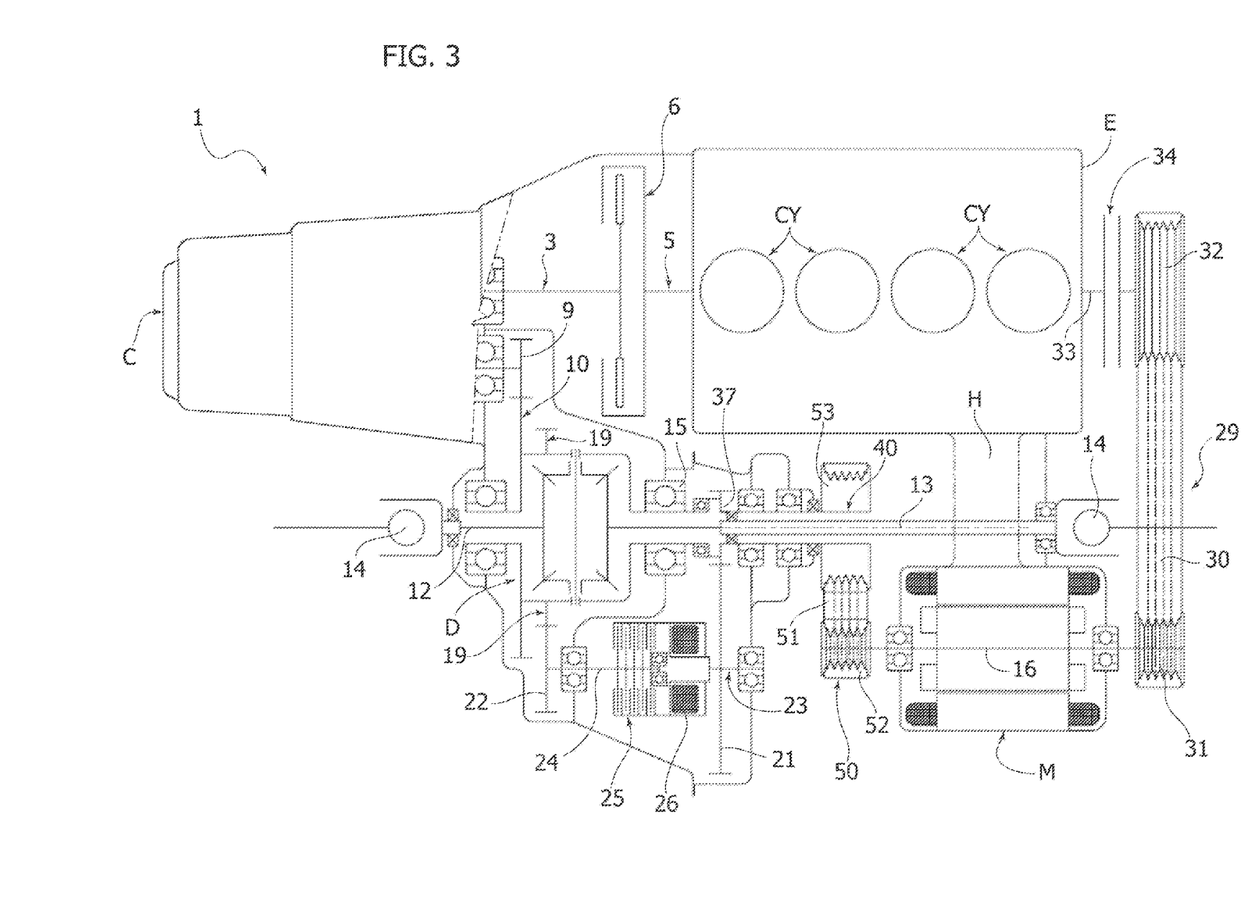
FIGS. 3-11 illustrate variants that do not envisage auxiliary devices of the motor vehicle associated to the engine unit according to the main characteristic of the present invention; however, the description of these variants is useful in so far as they include characteristics that can be adopted also in the case of the present invention.

FIG. 2 illustrates a variant, which has also already been proposed in the prior European patent application No. EP 13153802, that differs from the first embodiment of FIG. 1 in that the electric machine M has its axis arranged parallel to and at a distance from the axes of the output shafts 12, 13 of the differential D. In this case, the connection between the shaft 16 of the electric machine M and the second crown wheel 19 of the differential D is obtained by means of three gear-reduction jumps. A first jump is obtained by means of the pair of gears 35, 36. A second jump is obtained by means of the pair of gears 37, 21, and a third jump is obtained by means of the pair of gears 22, 19. The gears 36, 37 are carried by a hollow shaft 40 that is mounted freely rotatable within the casing 28 via rolling bearings 41. The hollow shaft 40 is traversed by the output shaft 13 of the differential D. In the embodiment of FIG. 3, the gears 21, 22 are arranged as described with reference to FIG. 1, in association with shafts 23, 24 that can be connected together by means of the electromagnetically governed engagement device 25.

FIG. 3 illustrates an embodiment that does not form the subject of the present invention. However, the description of this embodiment is useful for an understanding of the present invention. The solution of FIG. 3 has in common with the solutions of FIGS. 1 and 2 both provision of an engagement device 25 between the electric machine M and the differential D and provision of a connection, for example obtained by means of the belt transmission 29, between the shaft of the electric machine M and the shaft 5 of the internal-combustion engine E, on the side opposite to the gearbox device.

The main difference with respect to the solutions of FIGS. 1 and 2 lies in the fact that, in the case of FIG. 3, the transmission that connects the shaft 16 of the electric machine M with the crown wheel 19 of the differential D includes a gear-reduction jump constituted by a belt transmission 50. In the example illustrated, the belt transmission 50 constitutes a first gear-reduction jump. It comprises a belt 51 engaged on a pulley 52 connected to the shaft 16 of the electric machine M. The belt 51 is moreover engaged on a pulley 53 connected on the hollow shaft 40 already described with reference to FIG. 2. Downstream of the belt transmission 50, the transmission remains identical to that of FIG. 2, with the two pairs of gears 37, 21 and 22, 19, with the gears 21 and 22 arranged coaxially and connected by the engagement device 25.

Provision of the transmission between the electric machine and the differential with at least one gear-reduction jump constituted by a belt transmission enables a high flexibility in the positioning of the electric machine, this representing a considerable advantage above all in small-sized motor vehicles.

Of course, the configuration and arrangement of the belt transmission may even differ from what is illustrated by way of example in FIG. 3. For example, the total number of gear-reduction jumps could be other than three, and the belt transmission 50 could be used for a gear-reduction jump subsequent to the first one. In theory, it would also be possible to provide the electric machine aligned with the differential, as in the solution of FIG. 1, and use the belt transmission 50 for connecting the shaft of the electric machine with a parallel shaft arranged at a distance apart, which is in turn connected to a gear meshing with the crown wheel 19 of the differential.

It should moreover be noted that a further difference as compared to FIG. 2 lies in the fact that in FIG. 3 the electric machine M is supported, in an off-axis position with respect to the differential D, directly by the structure of the internal-combustion engine E, via a supporting structure H of any type, which is illustrated schematically in the drawing.

Figure 4:
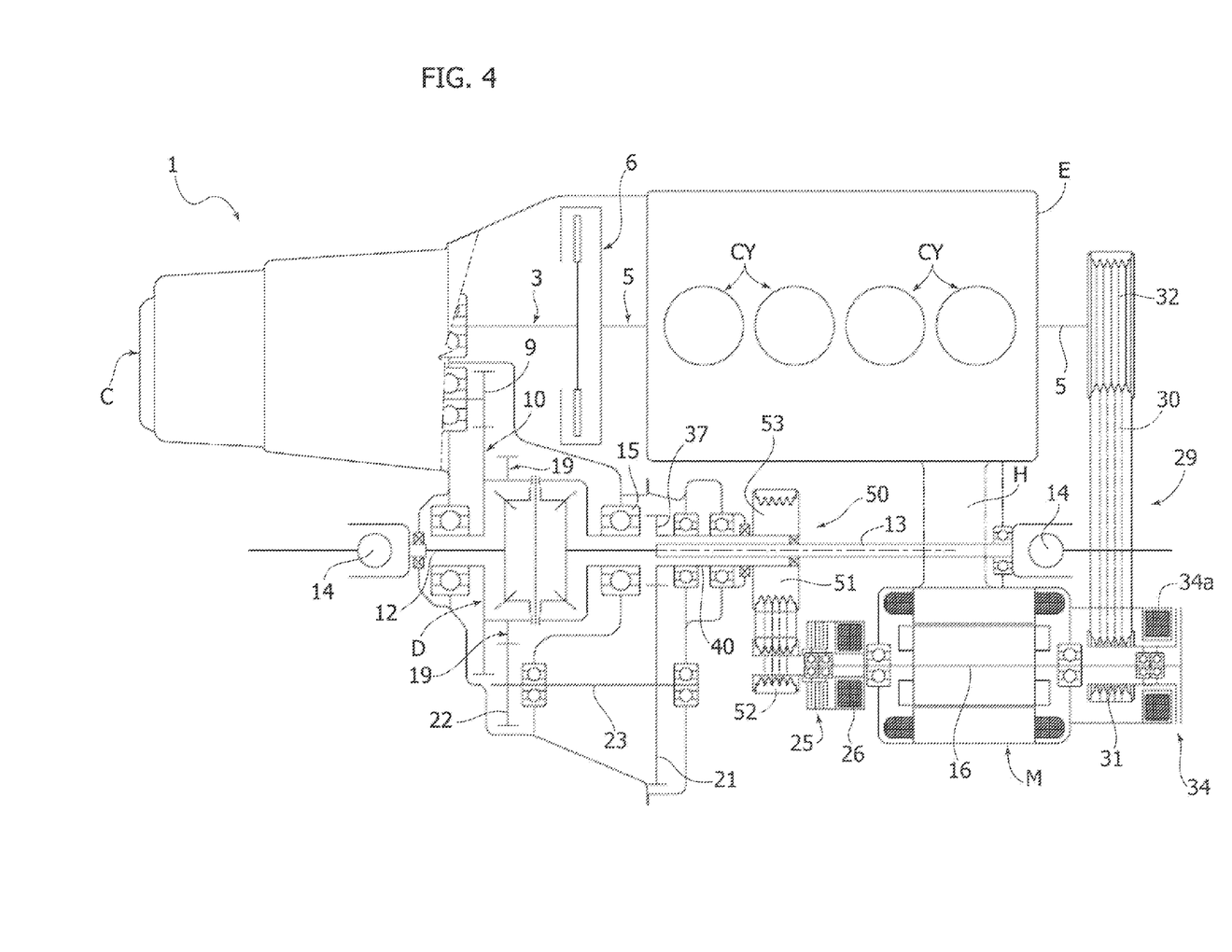

FIG. 4 illustrates an example of embodiment of the invention. A first difference as compared to the embodiment of FIG. 3 lies in the fact that, in this case, the gears 21, 22 are directly connected together, being both rigidly connected to a common shaft 23, whilst the engagement device 25, with the associated electromagnetic actuator 26, is arranged between the shaft 16 of the electric machine M and the pulley 52 of the belt transmission 50 in a position coaxial with the electric machine M.

Once again in the case of FIG. 4, the engagement device 34 is not arranged between the shaft 5 of the internal-combustion engine and the pulley 32 of the belt transmission 29. In this case, the engagement device 34, provided with an electromagnetic actuator 34a, is arranged between the shaft of the electric machine M and the pulley 31 of the belt transmission 29. Consequently, in the embodiment of FIG. 4, the two engagement devices 25 and 34 are both coaxial to the shaft 16 of the electric machine M and are arranged on opposite sides with respect to the electric machine M.

In the solution of FIG. 4, the pulley 31 and the pulley 52 are mounted on respective coaxial hollow shafts at the opposite ends of the shaft of the electric machine M and are connected to the latter by means of the engagement devices 34 and 25. The pulley 31 in this case is axially arranged between the electric machine and the engagement device 34.

Each of the actuators 26 and 34a is controlled by the electronic control unit U (see FIG. 1) on the basis of the operating conditions of the engine E.

Figure 5:
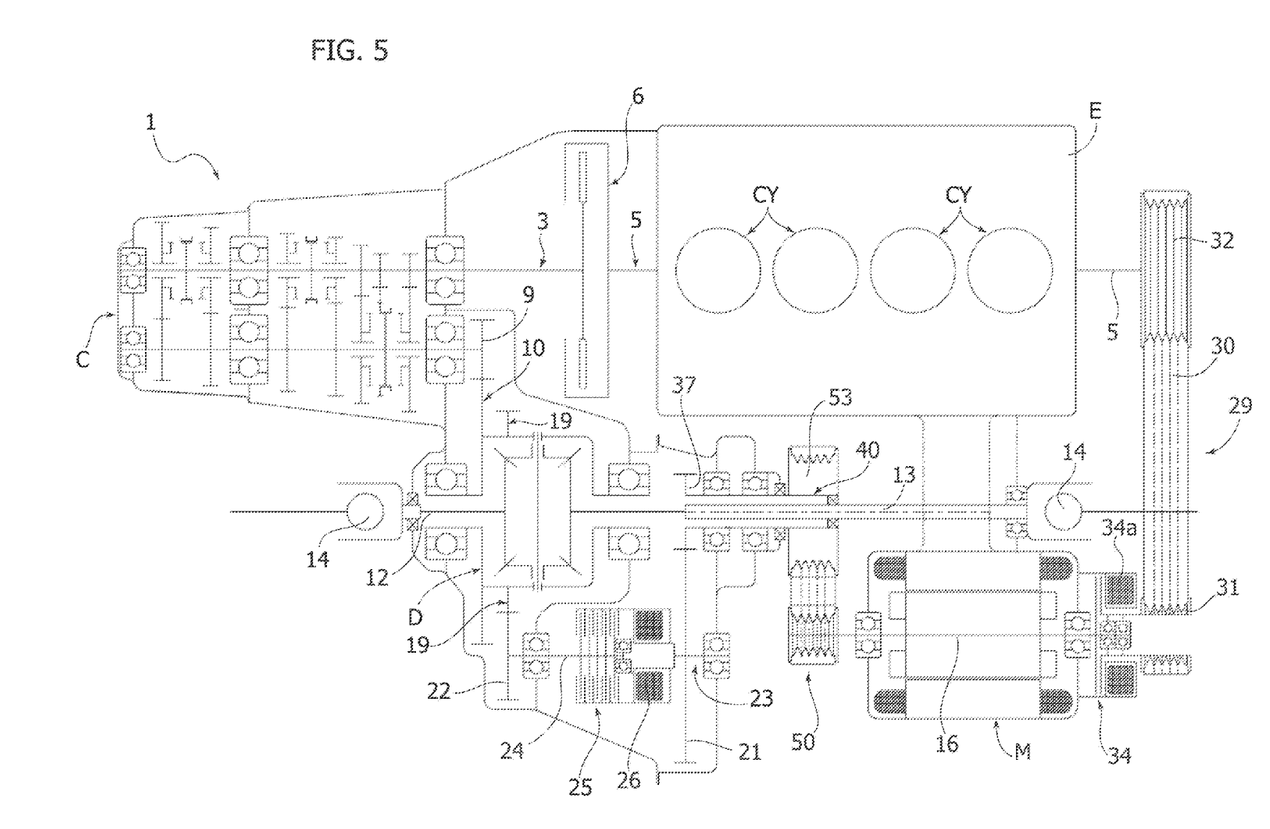

FIG. 5 shows a further variant that does not form the subject of the present invention and that has the engagement device 25 arranged between the gears 21 and 22, as in FIG. 3, and the engagement device 34 that is arranged between the shaft 16 of the electric machine M and the pulley 31, as in FIG. 4. In this case, however, the ensemble of the engagement device 34 and the actuator 34a is arranged axially between the pulley 31 and the electric machine M. The latter characteristic may be adopted also in the embodiment according to the invention that is illustrated in FIG. 4.

Figure 6:
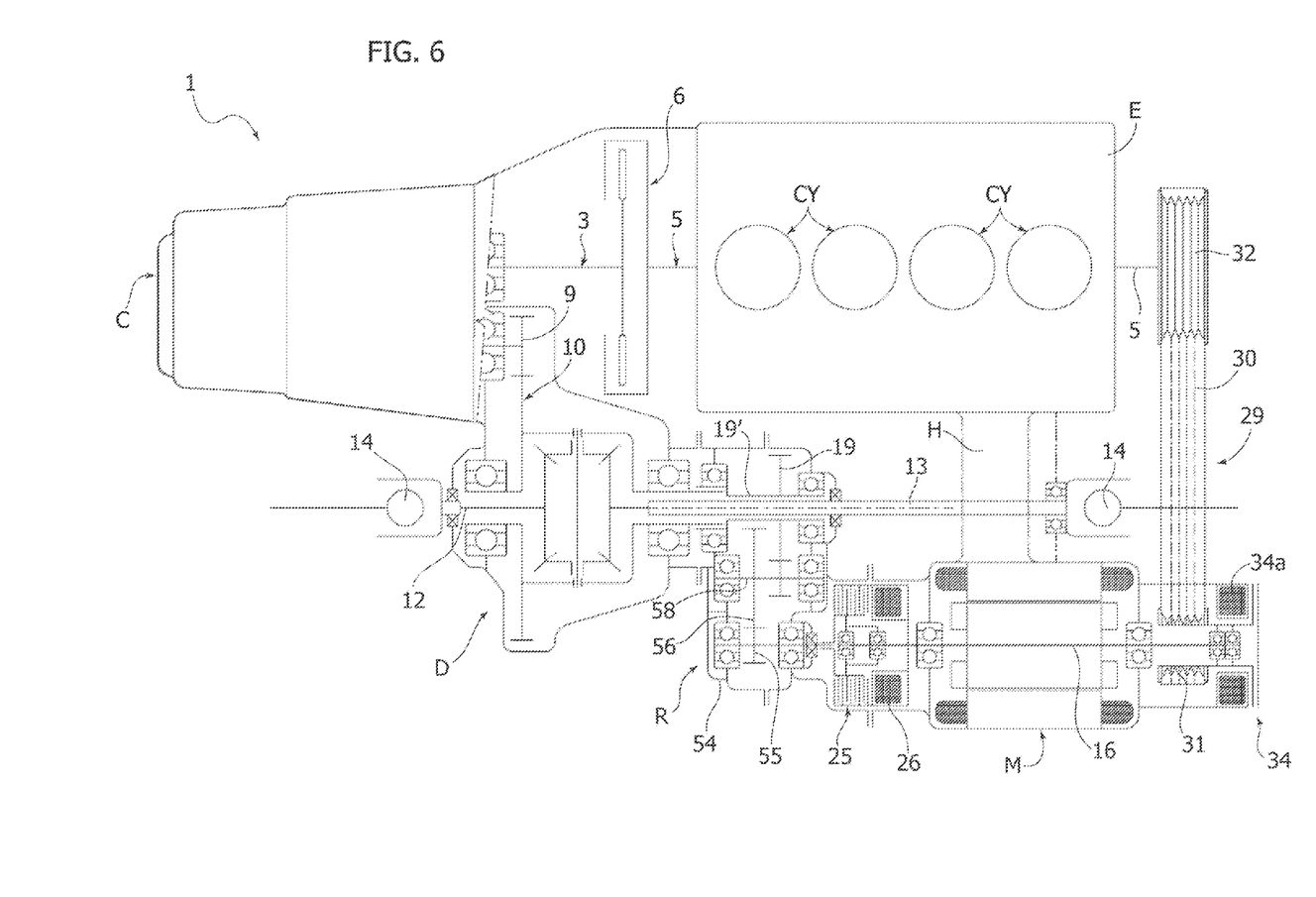

FIG. 6 illustrates a further embodiment of the present invention. In this variant, the transmission between the shaft 16 of the electric machine M and the differential D comprises a reducer R having a casing 54 rigidly connected to the casing of the differential D and adapted to provide two gear-reduction jumps. The first jump is provided by means of a gear 55 connected to a shaft, which is in turn directly connected to the shaft 16 of the electric machine M, on the prolongation thereof. The gear 55 meshes with a gear 56 of a shaft 58, which is parallel to the shaft 13 of the differential and to the shaft 16 of the electric machine M and is arranged in an intermediate position between them. Also connected on the shaft 58 is a gear 57 that meshes with the second crown wheel 19 of the differential D, which in this case is carried by a gear connected to a hollow shaft 19', which is in turn connected to the gear-train carrier of the differential and is arranged coaxially with respect to the shaft 13 of the differential.

Figure 7:
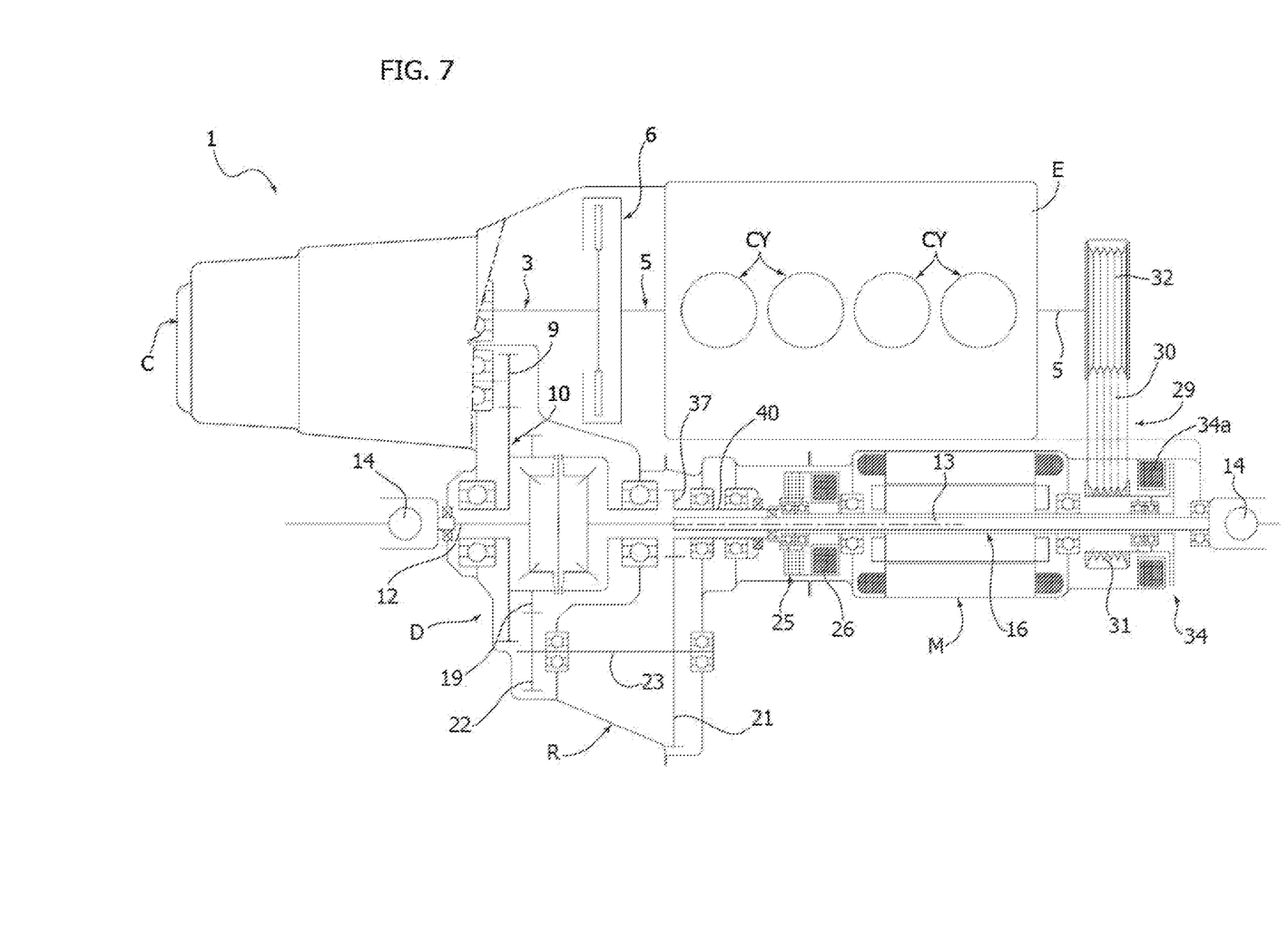

FIG. 7 illustrates a further embodiment of the present invention. In this case, unlike in FIG. 6, the electric machine M is mounted coaxially with the differential D, as in FIG. 1. Consequently, in the case of FIG. 7, as in FIG. 1, the shaft 16 is a hollow shaft and is traversed by the output shaft 13 of the differential. Once again in the case of the variant of FIG. 7, the transmission between the electric machine M and the differential D corresponds to the two final gear-reduction jumps of FIG. 4, with the pairs of gears 37, 21 and 22, 19 and with the gears 21, 22 directly connected together via a common shaft 23.

Figure 8:
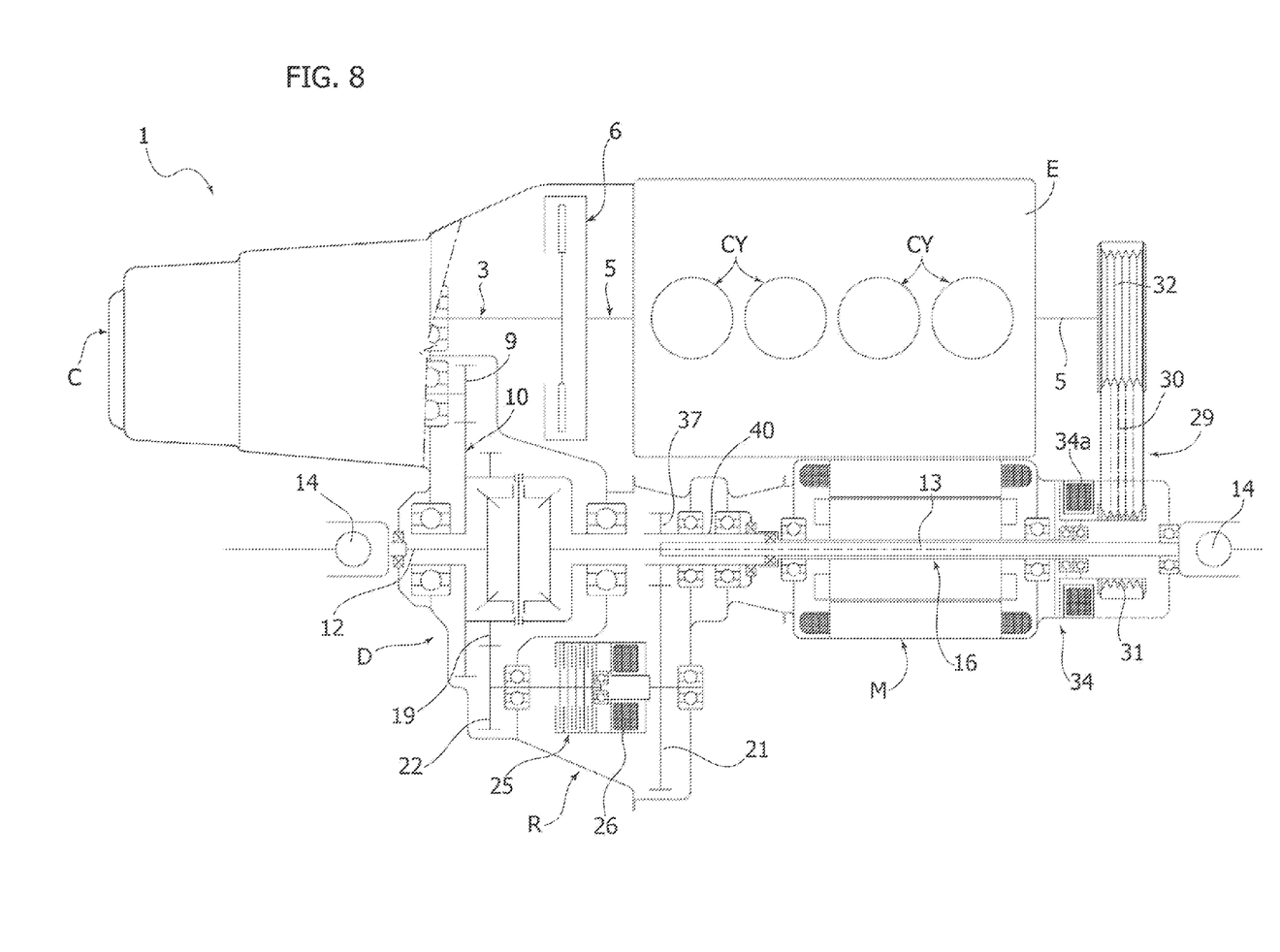

The variant of FIG. 8 does not form the subject of the invention in so far as here the engagement device 25 is arranged between the gears 21, 22.

Figure 9:
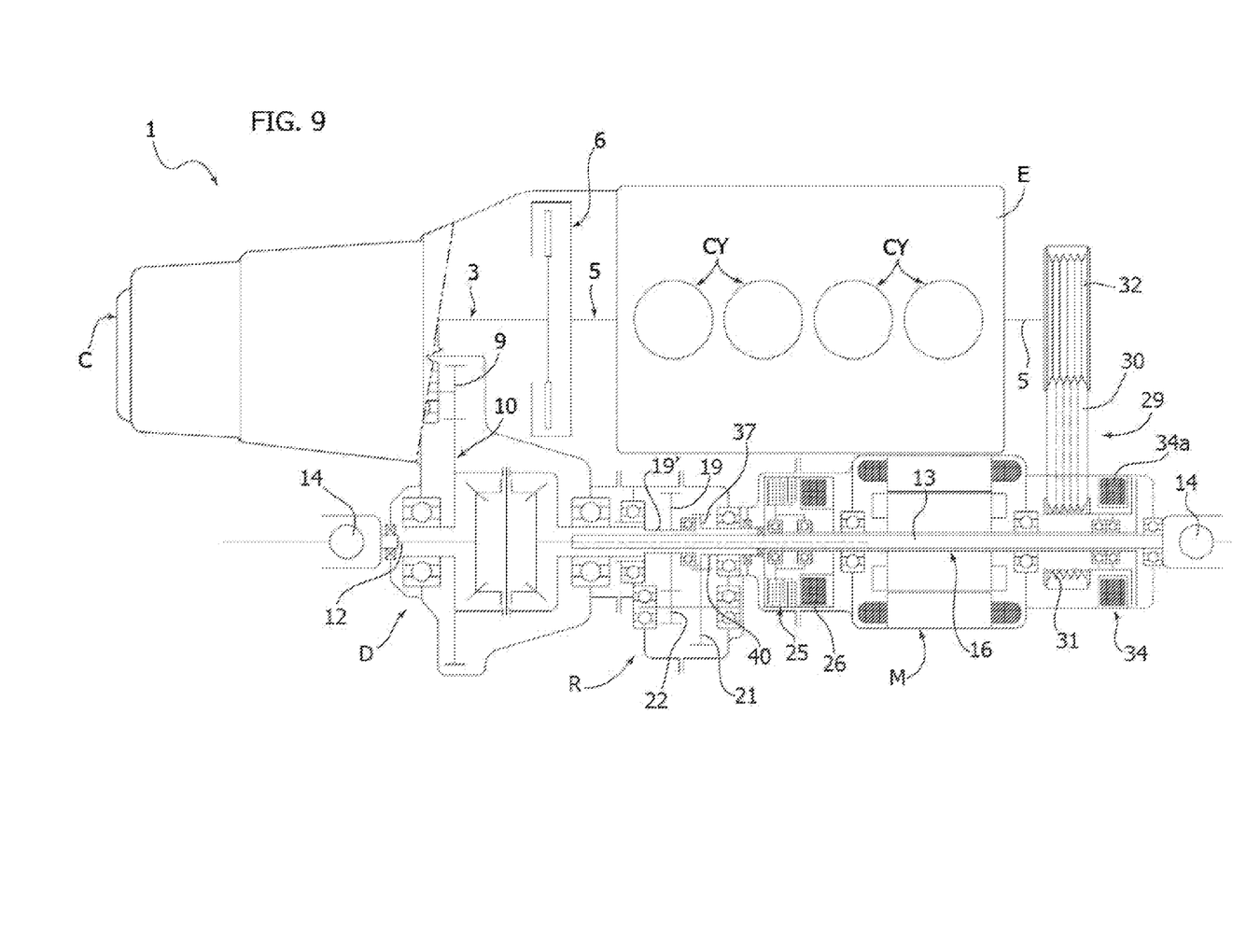

FIG. 9 illustrates a further embodiment of the invention, which differs from that of FIG. 7 in that the second crown wheel 19 of the differential is carried by a gear connected to a hollow shaft 19', which is in turn connected to the gear-train carrier of the differential and that is arranged coaxially with respect to the shaft 13 of the differential (as in FIG. 6).

Figure 10:
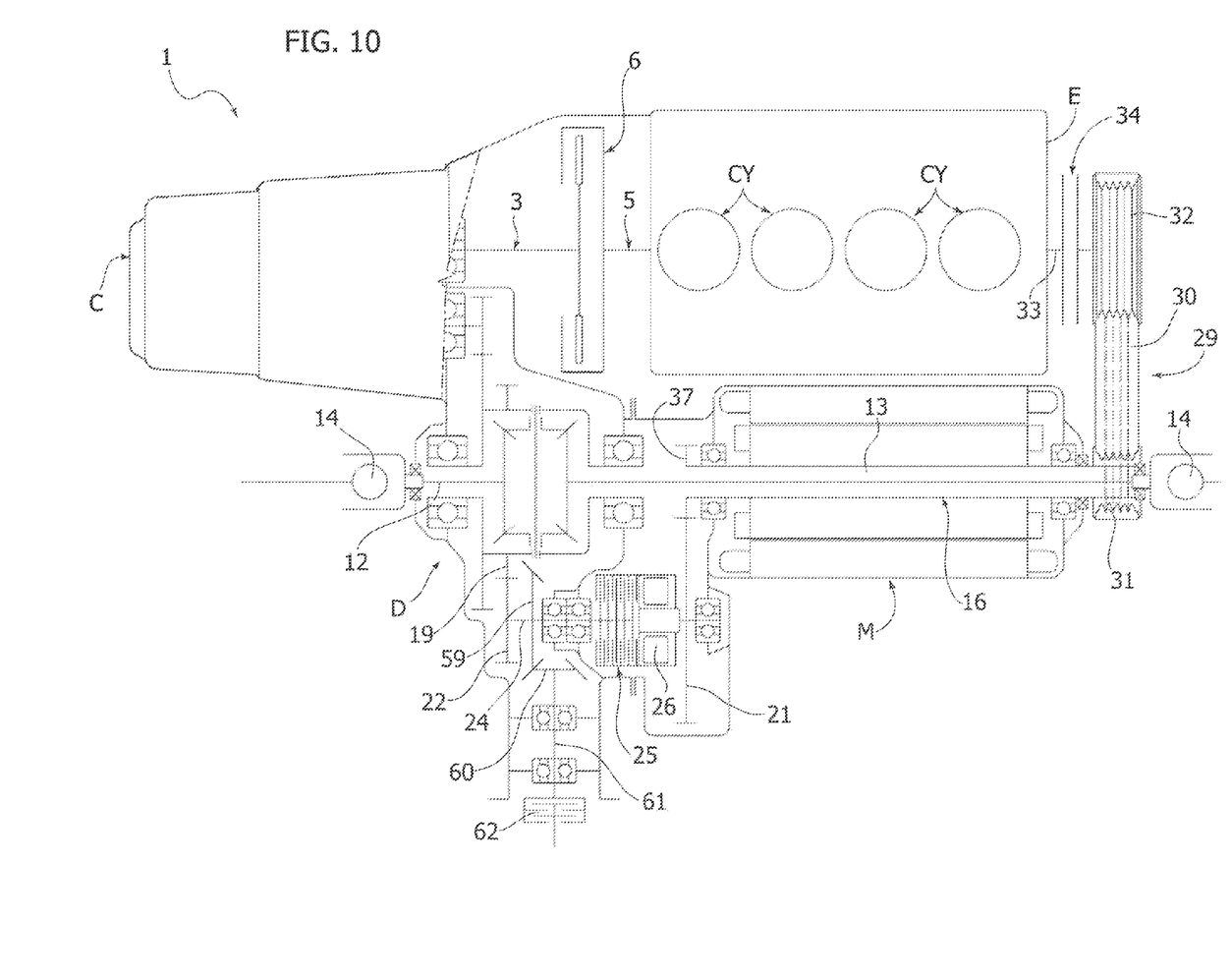
Figure 11:
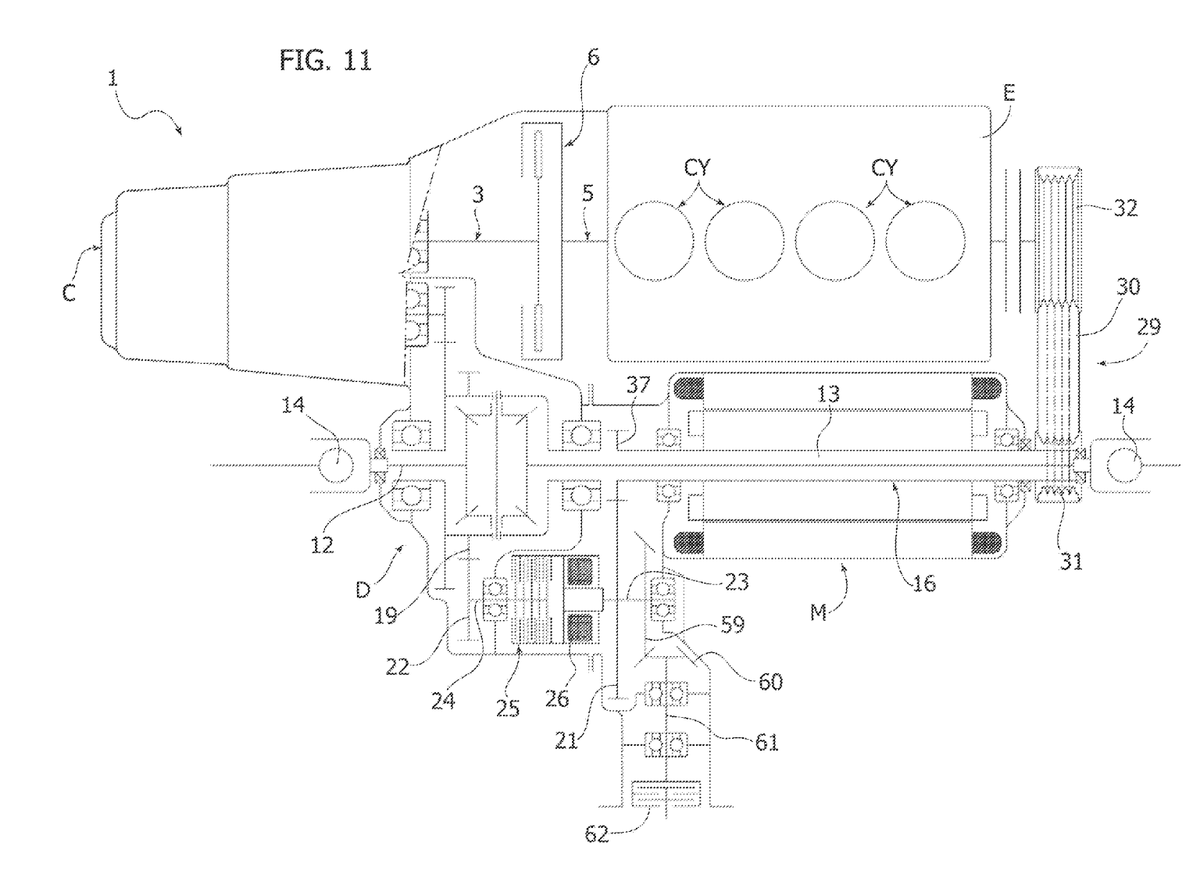

FIGS. 10 and 11 show variants that do not envisage the main characteristic forming the subject of the invention, but present additional characteristics that can in any case be adopted also in the case of the present invention. These figures refer to two different embodiments adapted to be applied to vehicles with four-wheel drive, in which the transmission that connects the shaft 16 of the electric machine M to the second crown wheel 19 of the differential D includes a gear for driving a transmission shaft connected to a further axle (in the example the rear axle) of the vehicle. This connection to a further axle of the vehicle could be adopted also in the case of the present invention.

Both of the examples of FIGS. 10 and 11 refer to the case of electric an machine M arranged coaxially with respect to the shafts 12, 13 of the differential, with two gear-reduction jumps constituted by the pairs of gears 37, 21 and 22, 19 and with the engagement device 25 arranged between the two coaxial gears 21, 22.

In the case of FIG. 10, the gear for driving the transmission shaft connected to the further axle of the vehicle is a bevel gear 59, arranged, in the transmission, between the second crown wheel 19 of the differential D and the engagement device 25. The gear 59 is mounted on the shaft 24 and meshes with a bevel gear 60 having its axis orthogonal to the axis of the shaft 24. The bevel gear 60 is rigidly connected to the transmission shaft 61 that transmits power to the other axle of the vehicle, preferably via a joint 62 of any known type.

In the case of FIG. 11, the gear for driving the transmission shaft connected to the further axle of the vehicle is a bevel gear 59, arranged, in the transmission, between the engagement device 25 and the shaft 16 of the electric machine M. The gear 59 is mounted on the shaft 23 and meshes with a bevel gear 60 having its axis orthogonal to the axis of the shaft 23. The bevel gear 60 is rigidly connected to the transmission shaft 61 that transmits power to the other axle of the vehicle via a joint 62.

In the case of FIG. 10, the torque of the electric machine is shared between the front axle and the rear axle in a way identical to what occurs as regards the torque of the internal-combustion engine, whereas, in the case of FIG. 11, the functions of the electric machine are irrespective of the distribution of the torque of the internal-combustion engine, and it may even be envisaged that 100% of the torque of the internal-combustion engine is transmitted to the front axle of the motor vehicle and 100% of the torque of the electric machine is transmitted to the rear axle.

Figure 12:
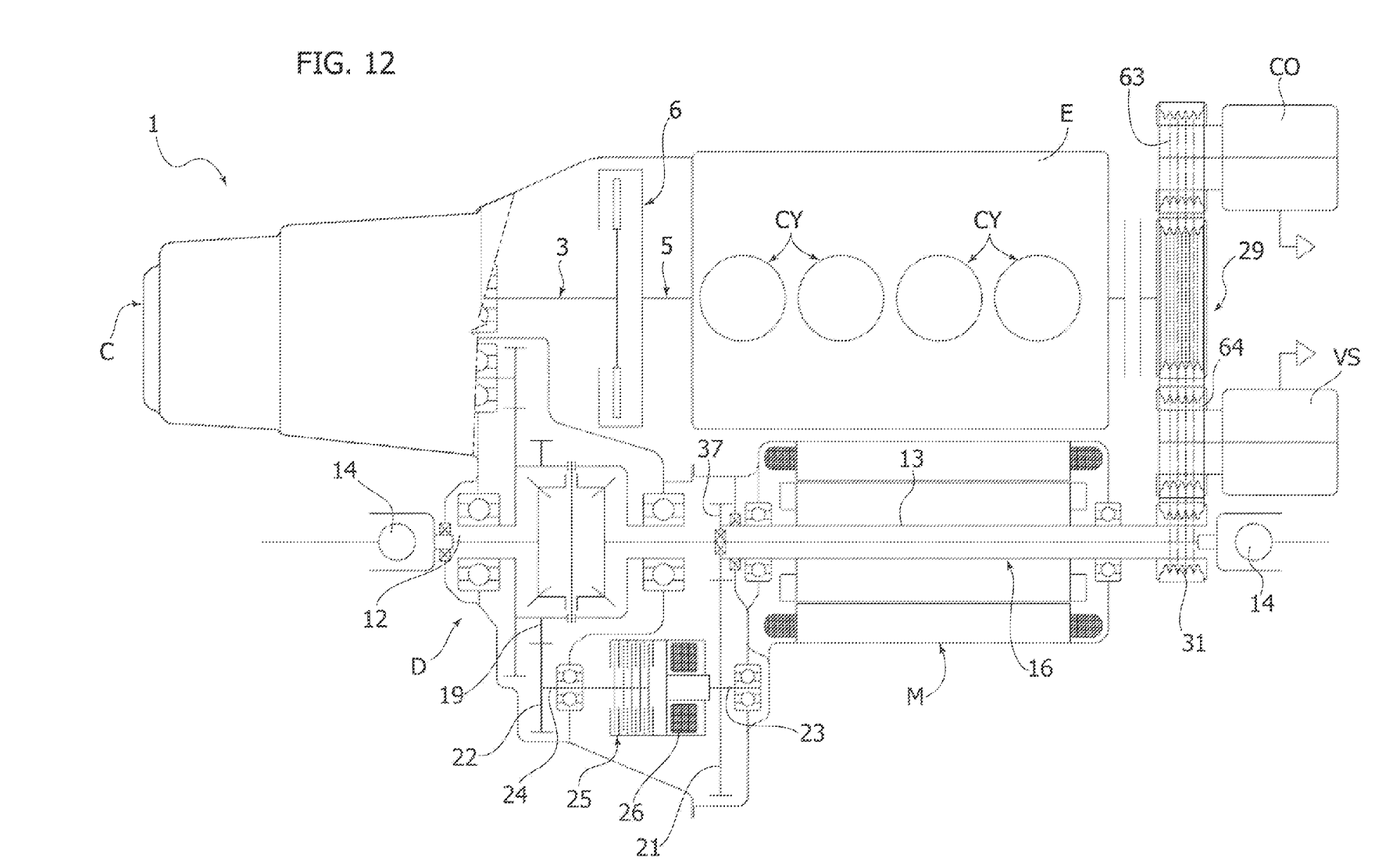
FIG. 12 shows an embodiment with auxiliary devices controlled by the belt transmission that directly connects the shaft of the electric machine to the shaft of the internal-combustion engine, according to what is already envisaged in the European patent application No. EP 13153802.
Figure 13:
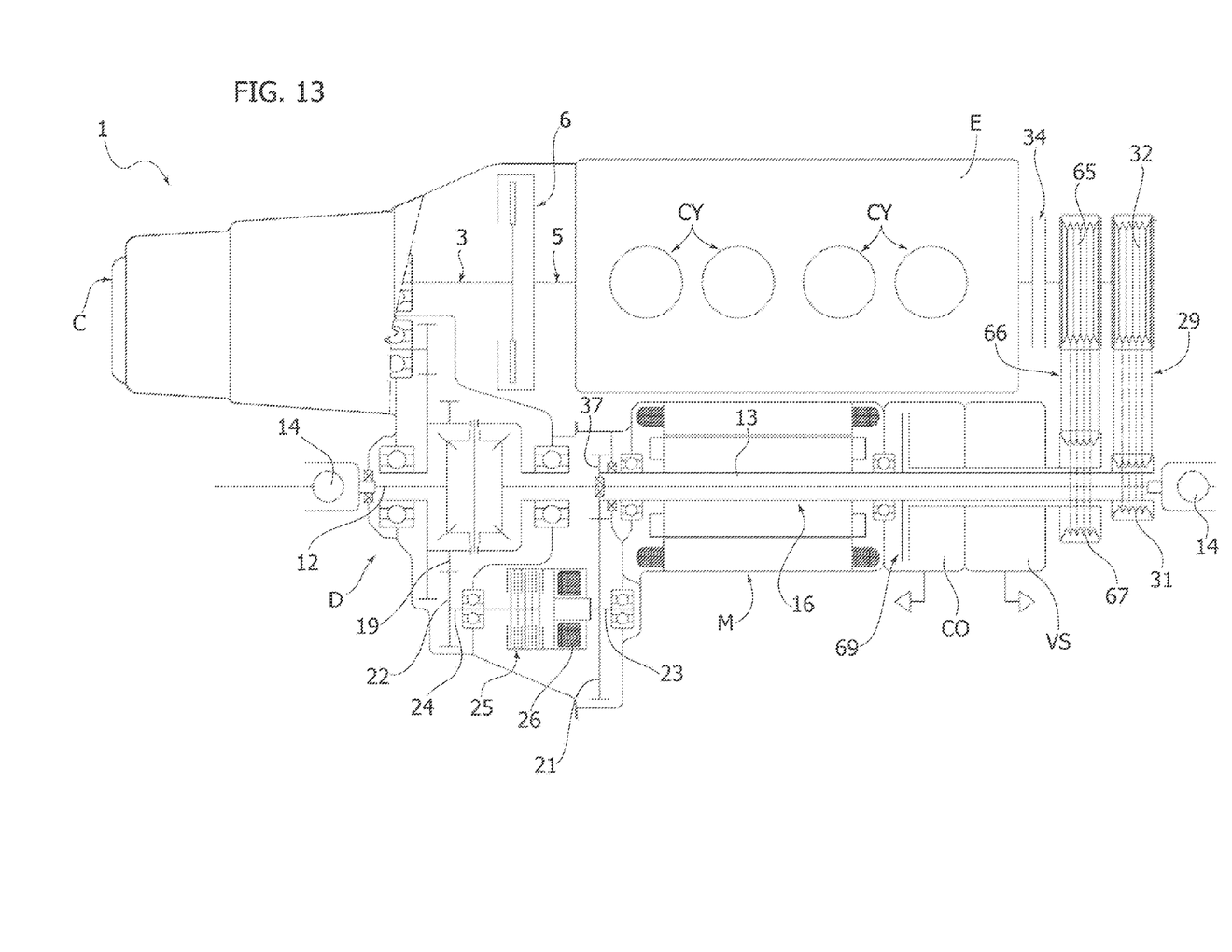
FIG. 13 illustrates an embodiment according to the present invention.

FIGS. 12 and 13 show variants that do not envisage the main characteristic forming the subject of the invention, but that present additional characteristics that can in any case be adopted also in the case of the present invention. In these variants, the belt transmission 29 controls also one or more auxiliary devices of the motor vehicle, such as, for example, a compressor CO of an air-conditioning system and a source of negative pressure VS for the braking system.

In the case of FIG. 12, the auxiliary belt transmission 29 is engaged on pulleys 63, 64 for actuation of said auxiliary devices.

In the case of FIG. 13, which illustrates an embodiment of the present invention, the pulley 32 of the belt transmission 29 is connected in rotation with a pulley 65 that controls, by means of a further belt transmission 66, the auxiliary devices CO and VS. The belt transmission 66 connects the pulley 65 to a pulley 67 connected to a tubular shaft 68 coaxial with the tubular shaft 16 of the electric machine (in FIGS. 10 and 11, the electric machine is coaxial with the shafts 12, 13 of the differential). The shaft 68 is connected to the shaft 16 via an engagement device 69.

Use of the belt transmission 29 for control of auxiliary devices could be envisaged also in the case of the present invention Of course, without prejudice to the principle of the invention, the details of construction and the embodiments may vary widely with respect to what has been described and illustrated herein purely by way of example, without thereby departing from the scope of the present invention.

What is claimed is:

1. A hybrid powertrain unit for a motor vehicle, comprising:
    an internal-combustion engine;
    a gearbox device including:
        at least one primary shaft, that can be connected to shaft of the internal combustion-engine by a clutch device;
        at least one secondary shaft, an axis of which is parallel to and at a distance from an axis of said at least one primary shaft and which carries an output pinion;
        a plurality of pairs of gears corresponding to a plurality of forward gear ratios, in which one of the gears of each pair of the plurality of pairs of gears is rigidly connected in rotation with respect to one of said at least one primary and secondary shafts and the other is freely rotatable with respect to the other of said at least one primary and secondary shafts; and
        a plurality of gear-selection devices for coupling in rotation each of said freely rotatable gears with the shaft on which it is mounted;
    a differential, having a first crown wheel meshing with said output pinion of said at least one secondary shaft of the gearbox device;
    an electric machine adapted to operate both as an electric motor and as an electric generator and having a casing rigidly connected to a supporting structure of said powertrain unit, and a shaft of the electric machine connected by a transmission to a second crown wheel of said differential;
    a first engagement device arranged, in said transmission, between the shaft of the electric machine and the second crown wheel of the differential; and
    an actuator arrangement for actuating said first engagement device;
    wherein the shaft of the electric machine is connected to the shaft of the internal-combustion engine at an end thereof opposite to an end connected to the gearbox device by a belt transmission including an endless belt engaged on a first pulley connected to the shaft of the electric machine and on a second pulley connected to the shaft of the internal-combustion engine;
    wherein arranged between the shaft of the electric machine and said first pulley is a second engagement device; and
    wherein said first and second engagement devices are both arranged coaxially with respect to the shaft of the electric machine, respectively on opposite sides with respect to the electric machine.

2. The unit according to claim 1, wherein said first engagement device and said second engagement device are clutch engagement devices provided with actuator arrangements comprising an electromagnetic or electrohydraulic actuator and an electronic unit for control of said actuator.

3. The unit according to claim 1, wherein said first pulley is mounted on a hollow shaft coaxial to the shaft of the electric machine and connected thereto by said second engagement device.

4. The unit according to claim 3, wherein said first pulley is axially arranged between the electric machine and said second engagement device.

5. The unit according to claim 3, wherein said second engagement device is axially arranged between the electric machine and said first pulley.

6. The unit according to claim 1, wherein said transmission that connects the shaft of the electric machine to said second crown wheel of the differential includes at least one gear-reduction jump constituted by a belt transmission.

7. The unit according to claim 1, wherein said transmission that connects the shaft of the electric machine to said second crown wheel of the differential includes a gear for driving a transmission shaft connected to a further axle of the vehicle different from an axle of the vehicle associated with output shafts of the differential.

8. The unit according to claim 1, further comprising one or more auxiliary devices of the motor vehicle, the one or more auxiliary devices including one or more of a compressor for an air-conditioning system and a source of negative pressure for the braking system, and
    wherein said belt transmission controls said one or more auxiliary devices.

* * * * *